Figure 1:
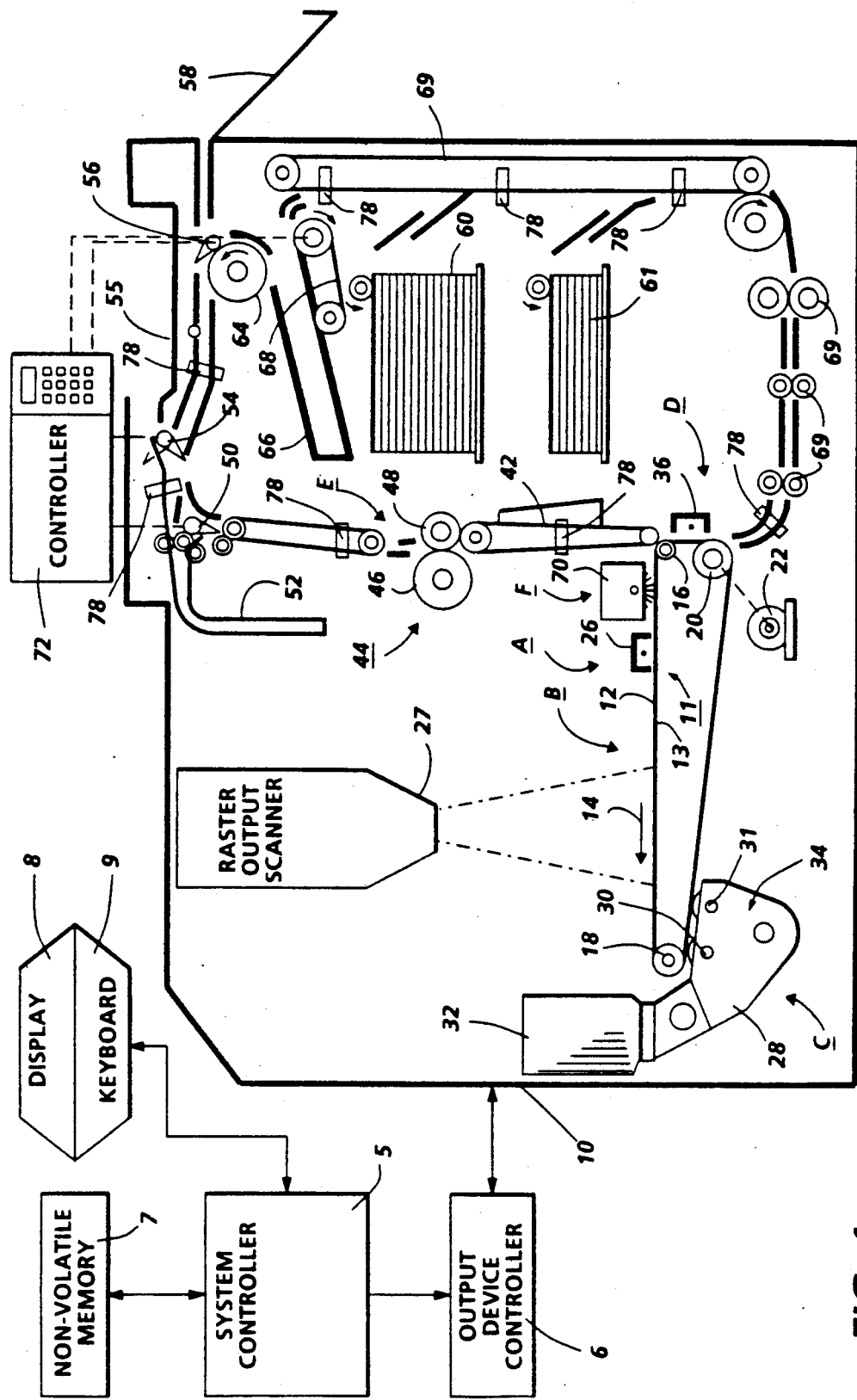

United States Patent [19]

O'Connell

[11] Patent Number: 5,034,770
[45] Date of Patent: Jul. 23, 1991

[54] JOB INTEGRITY AND SECURITY APPARATUS

[75] Inventor: David B. O'Connell, Mendon, N.Y.

[73] Assignee: Xerox Corporation, Stamford, Conn.

[21] Appl. No.: 574,824

[22] Filed: Aug. 30, 1990

[51] Int. Cl.$^5$ .......................................... G03G 21/00
[52] U.S. Cl. ................................... 355/201; 355/204; 355/308
[58] Field of Search ............... 355/201, 316, 308, 133, 355/200, 202, 204, 206, 207, 205, 209

[56] References Cited

U.S. PATENT DOCUMENTS

| | | | |
|---|---|---|---|
| 3,588,472 | 6/1971 | Glaster et al. | 355/308 |
| 3,813,157 | 5/1974 | Fantozzi | 355/206 X |
| 4,163,897 | 8/1979 | Hubbard et al. | 355/207 X |
| 4,229,100 | 10/1980 | Travis | 355/207 X |
| 4,511,241 | 4/1985 | Tsudaka et al. | 355/207 |
| 4,521,102 | 6/1985 | Motomura et al. | 355/206 |

OTHER PUBLICATIONS

Bacon et al, "Copier Security System," IBM Technical Disclosure Bulletin, vol. 18, No. 6, 11/75—pp. 1747-1748.
Marinace, "Copier System for Confidential Papers," IBM Technical Disclosure Bulletin, vol. 15, No. 7, 12/72—pp. 2328.

Primary Examiner—Arthur T. Grimley
Assistant Examiner—William J. Royer
Attorney, Agent, or Firm—H. Fleischer; J. E. Beck; R. Zibelli

[57] ABSTRACT

An apparatus and method which provides job integrity and security for each sheet transported to and from a printing station including periods when a printing machine has cycled down enabling an operator to remove sheets therefrom. Each sheet transported to the printing station and each sheet delivered from the printing station is counted. A controller compares the number of sheets transported to the printing station to the number of sheets delivered from the printing station and the number of any sheets that may have been removed by the operator from the printing machine as a result of a cycle down. Operation of the printing machine will be inhibited if the number of sheets transported to the printing station do not equal the number of sheets delivered from the printing station and the number of sheets removed by the operator. Conversely, operation of the printing machine will be enabled if the number of sheets transported to the printing station does not equal the number of sheets delivered from the printing station and the number of sheets removed by the operator.

23 Claims, 3 Drawing Sheets

JOB INTEGRITY AND SECURITY APPARATUS

This invention relates generally to a printing machine, and more particularly to an apparatus and method for maintaining job integrity and security.

Generally, an electrophotographic printing machine includes a photoconductive member which is charged to a substantially uniform potential so as to sensitize its surface. Then the charged portion of the photoconductive surface is exposed to a light image that discharges the charged portion to create a latent image. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a sheet. Finally, the toner particles are heated to permanently affix the powder image to the sheet.

Currently, printing machines are used to encode checks and other negotiable documents. In this type of printing application it is very important that the integrity and security of the printed documents be maintained at all times. The integrity and security of the printed documents are at a minimum when the printing machine cycles down because the current machines do not count each sheet fed to a printing station, each sheet delivered from the printing station, and any sheets that may have been removed by an operator during a cycle down. Only sheets that are on a jam switch will be readily detected and can be counted as removed. The remaining sheets within the printing machine will not be accounted for. Another problem with the current printing machines is that there are no mechanisms providing a second level of security to prevent operator theft or error. The operator is completely entrusted and must make sure that every sheet used in the printing machine including sheets cleared by the operator following the cycle down is accounted for. The present invention sets forth an apparatus and method that counts each sheet fed to a printing station, each sheet delivered from a printing station, and any sheets that may have been removed by an operator during a cycle down, and compares the above counts to maintain job integrity and security.

Various techniques have been devised for counting copy sheets passing through a copier during a production run. The following disclosures may be relevant to various aspects of the present invention:

U.S. Pat. No. 4,163,897: patentee—Hubbard et al; date issued—Aug. 7, 1979.

U.S. Pat. No. 4,229,100: patentee—Travis; date issued—Oct. 21, 1980.

U.S. Pat. No. 4,511,241: patentee—Tsudaka et al.; date issued—Apr. 16, 1985.

U.S. Pat. No. 4,521,102: patentee—Motomura et al.; date issued—June 4, 1985.

The relevant portions of the foregoing disclosures may be briefly summarized as follows:

U.S. Pat. No. 4,163,897 discloses an automatic job recovery process for a copying machine which computes the total number of replacement copies that need to be reproduced when a paper jam defaces copy sheets during a production run. The job recovery process involves 1) keeping a separate count of the total number of copies made for each respective image; 2) decrementing this count one-by-one as finished copy sheets exit a sheet transport pathway; and 3) computing the number of images which must be recopied and the total number copies to be reproduced for each respective image in the production.

U.S. Pat. No. 4,229,100 discloses an automatic job recovery process for a copying machine which computes the total number of replacement copies that need to be reproduced when a paper jam defaces copy sheets during plural production runs.

U.S. Pat. No. 4,511,241 discloses a job recovery method for a copying machine which restores the number of copy sheets lost or removed from a paper transport pathway when a paper jam occurs. The process involves storing in respective first and second counters the number of sheets fed into and discarded from a paper transport pathway. A paper jam is detected when the values stored within the counters do not agree at the end of a production run. Then, the first counter assumes the value stored within the second counter and additional sheets are fed into the machine up to a predetermined value to replace those lost or damaged during the jam.

U.S. Pat. No. 4,521,102 discloses a job recovery method for a copying machine that includes the steps of counting the copy paper, terminating the feed of the copy paper when the counting value becomes equal to a predetermined number, counting the discharged copy paper, and detecting a paper jam.

In accordance with one aspect of the present invention, there is provided an apparatus for maintaining job integrity and security for each sheet transported to and from a printing station including periods when the printing machine has cycled down enabling an operator to remove sheets therefrom. The apparatus includes a first means for counting each sheet transported to the printing station and a second means for counting each sheet delivered from the printing station. There is an operator input means for entering the number of any sheets removed from the printing machine during a cycle down. A means, responsive to the first counting means, the second counting means, and to the input means compares the number of sheets transported to the printing station with the number of sheets delivered from the printing station and number of sheets removed by the operator during cycle down. Operation of the printing machine is inhibited when the number of sheets transported to the printing station does not equal the number of sheets delivered from the printing station and the number of sheets removed by the operator. Conversely, operation of the printing machine will be enabled when the number of sheets transported to the printing station equals the number of sheets delivered from the printing station and the number of sheets removed by the operator.

Pursuant to another aspect of the present invention, there is provided an electrophotographic printing machine of the type having a sheet feeding module, a printing station for inputting indicia on each sheet, and a sheet receiving module, for maintaining job integrity and security for each sheet transported to and from a printing station. Job integrity and security is maintained during periods wherein the printing machine has cycled down enabling an operator to remove sheets therefrom. The improvement includes first means for counting each sheet transported to the printing station from the sheet feeding module and a second means for counting each sheet delivered from the printing station to the sheet receiving module. Operator input means are provided for entering the number of sheets removed from the printing machine by the operator during the cycle down. Means, responsive to the first counting means, the second counting means, and to the operator input means are provided for comparing the number of sheets transported to the printing station from the sheet feeding module with the number of sheets delivered to the sheet receiving module from the printing station and the number of any sheets removed by the operator during the cycle down. Operation of the printing machine is inhibited when the number of sheets transported to the printing station does not equal the number of sheets delivered to the sheet receiving module and the number of sheets removed by the operator. Conversely, operation of the printing machine will be enabled when the number of sheets transported to the printing station equal the number of sheets delivered to the sheet receiving module and the number of any sheets removed by the operator.

Another aspect of this invention is a method for maintaining integrity and security for each sheet transported to and delivered from a printing station wherein the printing machine has cycled down causing an operator to remove sheets therefrom. The method includes counting each sheet transported to the printing station from a sheet feeding module and counting each sheet delivered from the printing station to a sheet receiving module. The number of sheets removed by the operator from the printing machine during the cycle down is entered through an operator input means. The method further includes comparing the number of sheets transported to the printing station from the sheet feeding module with the number of sheets delivered from the printing station to the sheet receiving module and the number of any sheets removed by the operator during the cycle down. Operation of the printing machine will be inhibited when the number of sheets transported to the printing station does not equal the number of sheets delivered from the printing station and the number of sheets removed by the operator during the cycle down. Conversely, operation of the printing machine will be enabled when the number of sheets transported to the printing station equals the number of sheets delivered to the sheet receiving module and the number of sheets removed by the operator during the cycle down.

Figure 2:
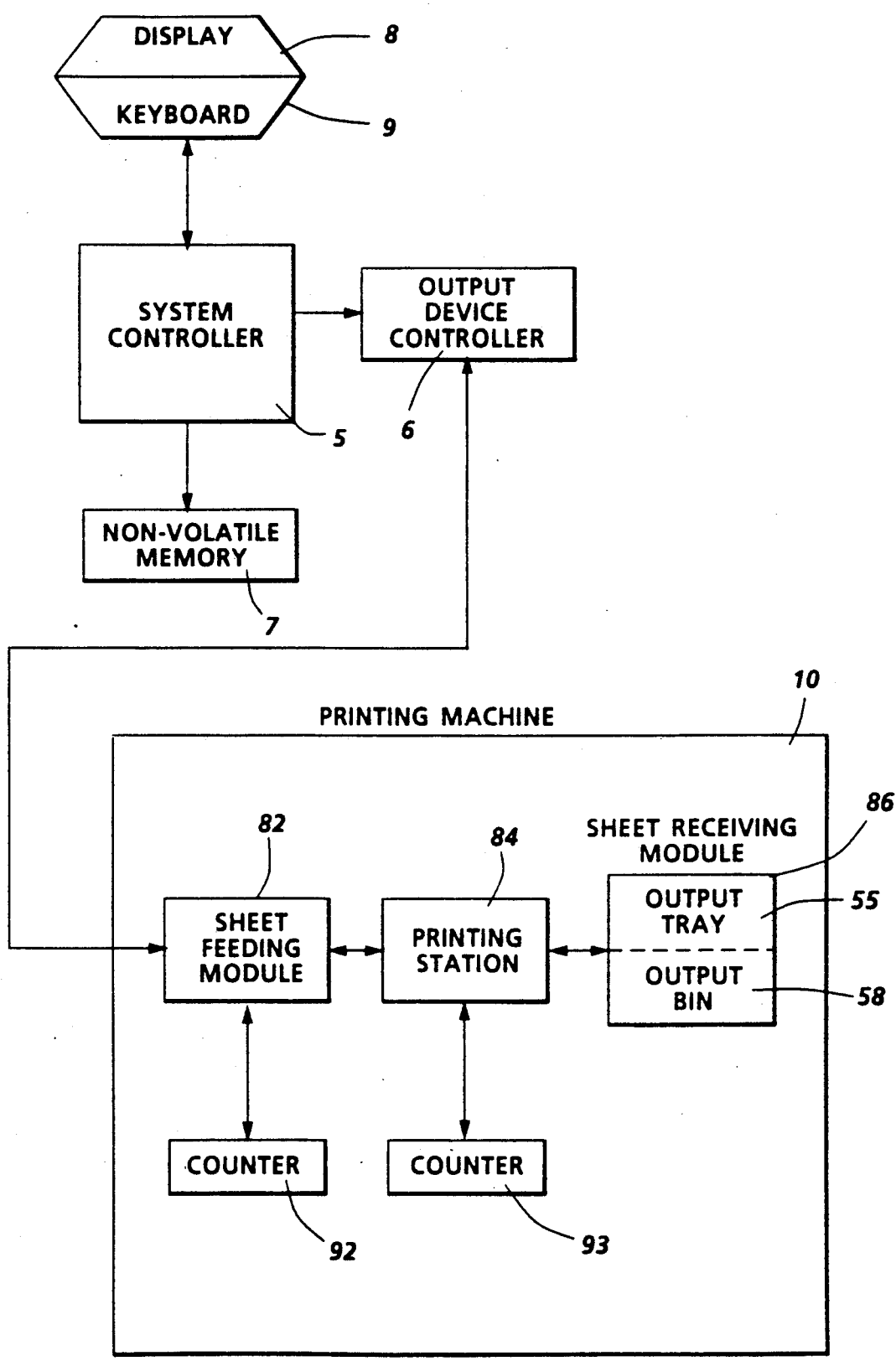
Figure 3:
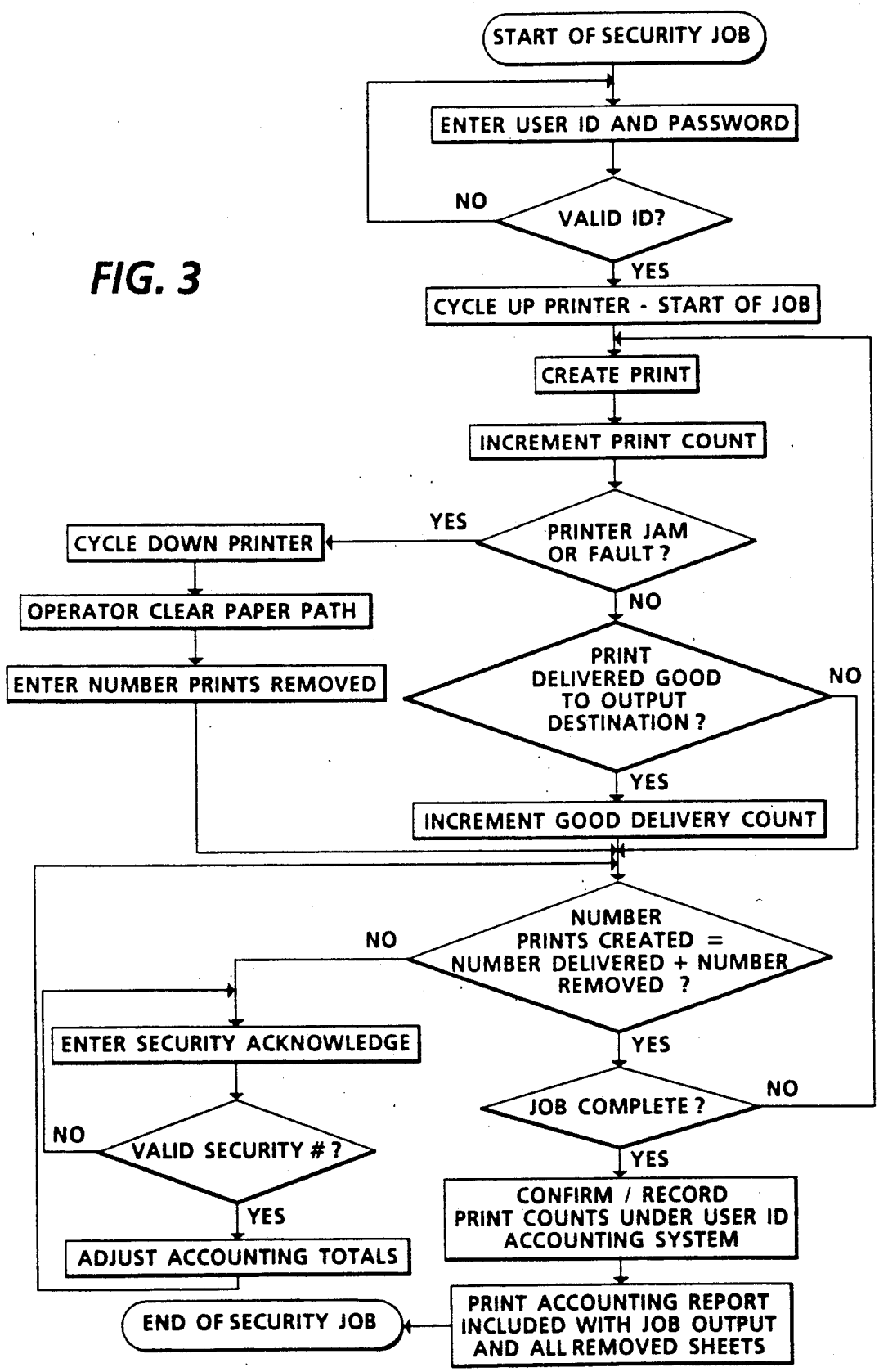

Other features of the present invention will become apparent as the following description proceeds and upon reference to the drawings, in which:

FIG. 1 is a schematic elevational view depicting an electrophotographic printing machine incorporating the features of the present invention therein; and FIG. 2 is a general block diagram of a printing machine incorporating the features of the present invention; and FIG. 3 is a general flow chart describing the features of the present invention.

While the present invention will hereinafter be described in connection with a preferred embodiment and method of use, it will be understood that it is not intended to limit the invention to this embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like reference numerals have been used throughout to designate identical elements. FIG. 1 schematically depicts the various components of the illustrative electrophotographic printing machine incorporating the features of the present invention therein. It will become evident from the following discussion that the apparatus and method for maintaining job integrity and security is well suited for use in a wide variety of printing machines, and it is not necessarily limited in its application to the particular printing machine described herein.

Inasmuch as the art of electrophotographic printing is well known, FIG. 1 shows a conventional electrophotographic printing machine with processing stations A, B, C, D, and E, attached to a system controller 5. System controller 5 outputs commands to electrophotographic printing machine 10 through an output device controller 6. Electrophotographic printing machine 10 employs a belt 11 having a photoconductive surface 12 deposited on a conductive substrate 13. Preferably, photoconductive surface 12 is made from a selenium alloy with conductive substrate 13 being made from an aluminum alloy. Other suitable photoconductive materials and conductive substrates may also be employed. Belt 11 moves in the direction of arrow 14 to advance successive portions of photoconductive surface 12 sequentially through the various processing stations disposed about the path of movement thereof. Belt 11 is entrained about a stripping roller 16, a tensioning roller 18, and a drive roller 20. Stripping roller 16 is mounted rotatably so as to be rotated with the movement of belt 11. Tensioning roller 18 is resiliently urged against belt 11 to maintain belt under the desired tension. Drive roller 20 is rotated by a motor 22 coupled thereto by suitable means such as a belt drive. As roller 20 rotates, it advances belt 11 in the direction of arrow 14.

Initially, a portion of photoconductive surface 12 passes through charging station A, wherein a corona generating device 26 charges photoconductive surface 12 to a relatively high substantially uniform potential.

Next, the charged portion of photoconductive surface is advanced through imaging station B wherein the uniformally charged photoconductive surface 12 is selectively discharged by a raster output scanner 27 creating a latent image of information that is to be printed. The raster output scanner includes a laser, a polygon surface, lenses, and mirrors. The laser generates a laser beam which places information on photoconductive surface 12 by switching the laser on and off as it moves, or scans, across belt 11. The image recorded on photoconductive surface 12 is actually a very close pattern of on/off dots that corresponds to the desired information. The rotating polygon surface sweeps the laser beam across the belt causing the information to be printed in a pattern of on/off dots. The lenses ensure that the beam shape is circular and that the beam scan is straight across the belt. The mirrors ensure that the optical system can fit into a small space. Thereafter, belt 11 advances the recorded electrostatic latent image to development station C.

At development station C, a magnetic brush development system 28 advances the developer material into contact with the electrostatic latent image. Preferably, magnetic brush development system 28 includes two magnetic brush developer rollers 30 and 31. These rollers each advance developer material into contact with the latent image. Each developer roller forms a brush comprising carrier granules and toner particles. The latent image attracts the toner particles from the carrier granules forming a toner powder image on the latent image. As successive latent images are developed, toner particles are depleted from the developer. A toner particle dispenser 32 is arranged to furnish additional toner particles to developer housing 34 for subsequent use by developer rollers 30 and 31, respectively. Toner dispenser 32 includes a container storing a supply of toner particles. A foam roller disposed in a sump coupled to the container dispenses toner particles into an auger. The toner particles are dispensed from the apertures in the tube into developer housing 34. Belt then advances the toner powder image to transfer station D wherein a sheet is moved into contact with the powder image.

Transfer station D includes a corona generating device 36 which sprays ions onto the backside of sheets sent from either paper tray 60 or 61. This attracts the toner powder image from photoconductive surface 12 to the sheet. After transferring the powder image to a sheet conveyor 42 advances the sheet to fusing station E.

Fusing station E includes a fuser assembly 44 which permanently affixes the transferred powder image to the sheet. Preferably, fuser assembly includes a heated fuser roller 46 and back-up roller 48 with the powder image contacting fuser roller 46. In this manner, the powder image is permanently affixed to the sheet.

After fusing, the sheets are fed to gate 50 which functions as an inverter selector. Depending upon the position of gate 50, the sheets will be deflected into sheet inverter 52, or will bypass inverter and be fed directly to a second decision gate 54. The sheets which bypass inverter 52 turn a 90° corner in the sheet path before reaching gate 54. At gate 54 the sheet is in a face-up orientation with the imaged side, which has been fused, face-up. If inverter path 52 is selected, the opposite is true, i.e., the last printed side is face-down. Decision gate 54 either deflects the sheet directly into an open output tray 55 or deflects the sheets into transport path which carries them onto a third decision gate 56. Gate 56 either passes the sheet to an output bin 58 or deflects the sheet onto a duplex inverter roll 64. Roll 64 inverts and stacks the sheets to be duplexed in duplex tray 66 when gate 56 so directs. Duplex tray 66 provides an intermediate or buffer storage for those sheets which have been printed on one side on which an image will be subsequently printed on the second, opposed, side thereof, i.e. the sheets being duplexed. Due to sheet inverting by roller 56, the buffer sheets are stacked, in tray 66 face down on top of one another in the order in which they are copied.

In order to complete duplex copying, the simplex sheets in tray 66 are fed in seriatim, by bottom feeder 68 from tray 66 back to transfer station D for transfer of the toner powder image to the opposite side of the sheet. Conveyors 69 advance the sheet along the path which produces an inversion thereof. However, inasmuch as the bottommost sheet is fed from duplex tray 66 the proper or clean side of the sheet is positioned in contact with belt 11 at transfer station D so that the toner powder image is transferred thereto. The duplex tray is then fed through the same path as if the simplex sheets were to be stacked in either tray 55 or in output bin 58.

Invariably, after the sheet is separated from photoconductive surface 12 of belt 11, some residual particles remain adhering thereto. These residual particles are removed from photoconductive surface at cleaning station F. Cleaning station F includes a rotatably mounted fibrous brush 70 which comes in contact with photoconductive surface 12 of belt 11. The particles are cleaned from photoconductive surface 12 by placing the surface in contact with the rotating brush 70. Subsequent to cleaning, a discharge lamp (not shown) floods photoconductive surface 12 with light to dissipate any residual electrostatic charge remaining thereon prior to the charging thereof for the next successive imaging cycle.

Controller 72 is preferably a programmable microprocessor which controls all the machine functions hereinbefore described. The controller provides a comparison of sheets delivered to sheets transported, the number of sheets being recirculated, the number of sheets selected by the operator, time delays, jam correction, etc. The control of all exemplary systems heretofore described may be accomplished by conventional control switch inputs from the printing machine console selected by the operator. Conventional sheet path sensors or switches 78 may be utilized for keeping track of the position of sheets. In addition, controller 72 regulates the various positions of the decision gates which is dependent upon the mode of operation selected.

It is believed that the foregoing description is sufficient for purposes of the present application to illustrate the general operation of an electrophotographic printing machine incorporating the features of the present invention therein.

Referring now to the specific subject matter of the present invention, the general operation will be described hereinafter with reference to FIGS. 2 and 3.

FIG. 2 shows a general block diagram of printing machine 10 shown in FIG. 1. Sheet feeding module 82 comprises paper tray 60 and auxiliary paper tray 61. The printing station for inputting indicia on each sheet 84 includes all of the elements from stations A, B, C, D, E, and F, which are schematically shown in FIG. 1 and were described earlier. The sheet receiving module 86 includes output tray 55 and output bin 58. FIG. 2 further comprises a system controller 5, a keyboard 9, a display 8, a non-volatile memory 7, and an output device controller 6.

To begin a security printing job an operator must log onto the printing machine by entering a user identification number and password into keyboard 9. Controller 5 compares the entered identification number and password to valid identification numbers and passwords stored in non-volatile memory 7 which prevents unauthorized users from accessing the printing machine. If the entered identification number and password are not valid controller 5 inhibits printing through output device controller 6. However, if the entered identification number and password are valid controller 5 enables the security printing job through output device controller 6. The authorized user is then held responsible for completing the printing job.

As printing machine 10 is enabled counter 92 initiates a print count for each sheet transported from sheet feeding module 82 to printing station 84 and counter 93 initiates a count of the sheets delivered from the printing station to sheet receiving module 86. The print count of counter 92 is incremented as each sheet is fed from sheet feeding module 82 to printing station 84 and the delivery count of counter 93 is incremented as each sheet is delivered from the printing station to sheet receiving module 86. The print count and the delivery count is maintained throughout the security printing job until either a printing jam or fault shutdown condition occurs and cycles down printing machine 10.

The printing jam or fault shutdown condition are detected by sensors 78 located within the printing machine as shown in FIG. 1. Sensors 78 generate a signal to controller 72 that a printer fault mode exists which in turn cycles down the printing machine and interrupts the security printing job. Then controller 72 enables the display to generate a message to the operator that there is either a printing jam or a fault condition present and requests that the sections where a jam or fault condition has been detected be cleared. Counter 93 will not account for the sheets that have been removed by the operator and therefore the delivery count will not reflect the correct amount of sheets that have actually been transported to printing station 84. In order to account for this inadequacy the display requests that the operator enter into the keyboard the number of sheets removed from the printing machine.

After the operator has entered the number of sheets that were removed from printing machine 10, controller 5 enables printing station 84 to purge all sheets therefrom to sheet receiving module 82. As the sheets are purged from printing station 84 counter 93 increments the delivery count for each sheet being purged in order to determine the total number of sheets sent from the printing station to the sheet receiving module. Sheet receiving module 86 includes sheet output tray 55 and sheet output bin 58. As printing station 84 purges all sheets to sheet receiving module 86 in response to the cycle down, sheets that are past decision gate 54 are sent to output tray 58 and sheets that have not reached decision gate 54 are sent to output bin 55. The print count of counter 92 reflects the total number of sheets transported to printing station 84 before the cycle down and the delivery count represents the number of sheets delivered to sheet receiving module 86. Controller 5 compares the number of sheets transported to printing station 84 with the number of sheets removed from the printing machine 10 by the operator and the number of sheets delivered to sheet receiving module 86. If the number of sheets transported to printing station 84 does not equal the number of sheets removed from the printing machine 10 by the operator and the number of sheets delivered to sheet receiving module 86, controller 5 will continue to inhibit operation of the printing machine. Then controller 5 would enable display 8 to generate a message that there is a security problem and would request a security inspection. A security inspection permits an authorized security person to adjust the print count and the delivery count totals registered in counters 92 and 93 so that they equal each other. Before the authorized security person can adjust the counts a security code must be entered into keyboard 9. Controller 5 compares the entered security code to a valid security code stored in non-volatile memory 7. If the entered security code does not match the valid security code then the authorized security person cannot adjust the count totals and printing machine 10 remains inhibited. Conversely, when the entered security code does match a valid security code stored in non-volatile memory 7, controller 5 permits the authorized security person to adjust the count totals. After the count totals have been properly adjusted controller 5 enables printing machine 10 to continue the security printing job.

The security inspection is not needed if the number of sheets transported to printing station 84 does equal the number of sheets removed from printing machine 10 by the operator and the number of sheets delivered to sheet receiving module 86. At this time controller 5 would enable operation of the printing machine so that the security printing job can be continued.

Even if printing machine 10 does not cycle down during the printing security job, controller 5 continuously compares the number of sheets transported to printing station 84 with the number of sheets delivered to sheet receiving module 86. If the counts do not equal each other the controller will cycle down printing machine 10 and prompt a security inspection in the manner stated above. If the counts do equal each other printing machine 10 maintains the security printing job.

At the end of each security printing job, controller 5 generates a printing report for the particular user identification number. The report provides a listing of printing parameters for that particular job which include at least the user identification number, the number of sheets transported to the printing station, the number of sheets delivered to the sheet receiving module, and the number of any sheets removed by the operator.

In recapitulation, the controller of the present invention maintains the integrity and security for each security printing job. The counters keep a count of the number of sheets transported to the printing station and the number of sheets delivered from the printing station. If the printing machine cycles down because of a sheet jam, an opening of printing machine doors, or a fault condition, the controller requests that the operator enter the number of any sheets that were removed from the printing machine. Then the controller compares the number of sheets transported to the printing station to the number of sheets delivered from the printing station and the number of any sheets removed by the operator. If the number of sheets delivered to the printing station does not equal the number of sheets transported from the printing station and the number of sheets removed by the operator, the controller will continue to inhibit operation of the printing machine. Then the controller will prompt a security inspection requiring an authorized security person to adjust the counts of the number of sheets transported to and delivered from the printing station, thus enabling the printing machine. However, if the number of sheets delivered to the printing station do equal the number of sheets transported from the printing station and the number of sheets removed by the operator the controller will enable the printing machine to finish the printing job. Even if the printing machine does not cycle down the controller still maintains job integrity and security by continuously comparing sheets transported to the printing station to sheets delivered from the printing station. At the end of each printing job a printout of the number of sheets transported to the printing station, the number sheets delivered from the printing station, and the number of sheets removed by the operator are provided.

It is, therefore, apparent that there has been provided in accordance with the present invention, a printing machine that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An apparatus for maintaining job integrity and security for each sheet transported to and delivered from a printing station in a printing machine in which the printing machine has cycled down enabling an operator to remove sheets therefrom, comprising:

first means for counting each sheet transported to the printing station;

second means for counting each sheet delivered from the printing station;

operator input means for entering the number of sheets removed from the printing machine by the operator during cycle down; and means, responsive to said first counting means, said second counting means, and to said input means for comparing the number of sheets transported to the printing station with the number of sheets removed by the operator during cycle down and the number of sheets delivered from the printing station, said comparing means inhibiting operation of the printing machine when the number of sheets transported to the printing station does not equal the number of sheets removed by the operator and the number of sheets delivered from the printing station, said comparing means enabling operation of the printing machine when the number of sheets transported to the printing station equals the number of sheets removed by the operator and the number of sheets delivered from the printing station.

2. An apparatus according to claim 1, further comprising means for removing each sheet that had been transported to the printing station until the time of the cycle down.

3. An apparatus according to claim 2, wherein the printing machine has an output tray and an output bin receiving sheets delivered from the printing station.

4. An apparatus according to claim 1, further comprising means for displaying messages regarding the status of the printing machine.

5. An apparatus according to claim 4, wherein said display means generates a first error message that a cycle down has occurred and request that the number of sheets removed from the printing machine as a result of the cycle down be entered by the operator in said input means.

6. An apparatus according to claim 4, wherein said display means generates a second error message that a security problem has been detected and requests that a security identification number be entered, said second error message being generated when said comparing means inhibits operation of the printing machine.

7. An apparatus according to claim 6, further comprising a nonvolatile memory storing valid security codes.

8. An apparatus according to claim 7, wherein said comparing means compares the entered security identification number to a security identification number stored in said nonvolatile memory, said comparing means maintaining the inhibiting print signal when the entered security identification number does not match the stored security identification number, said comparing means enabling the printing machine when the entered security identification number matches the stored security identification.

9. An apparatus according to claim 1, further comprising means for producing a report of printing parameters after each completed job.

10. An apparatus according to claim 9, wherein the printing parameters comprise at least the number sheets fed, delivered, and removed.

11. In an electrophotographic printing machine of the type having a sheet feeding module, a printing station for inputting indicia on each sheet, and a sheet receiving module, in which the printing machine has cycled down enabling an operator to remove sheets therefrom, wherein the improvement comprises:

first means for counting each sheet transported to the printing station from the sheet feeding module;

second means for counting each sheet delivered from the printing station to the sheet receiving module;

operator input means for entering the number of sheets removed from the printing machine by the operator during cycle down; and means, responsive to said first counting means, said second counting means, and to said operator input means for comparing the number of sheets transported to the printing station from the sheet feeding module with the number of sheets delivered to the sheet receiving module from the printing station and the number of sheets removed by the operator during cycle down, said comparing means inhibiting operation of the printing machine when the number of sheets transported to the printing station do not equal the number of sheets delivered to the sheet receiving module and the number of sheets removed by the operator, said comparing means enabling operation of the printing machine when the number of sheets transported to the printing station equal the number of sheets delivered to the sheet receiving module and the number of sheets removed by the operator.

12. A printing machine according to claim 11, further comprising means for removing each sheet that was transported to the printing station until the time of the cycle down to the sheet receiving module.

13. A printing machine according to claim 12, wherein the sheet receiving module has an output tray and an output bin receiving sheets delivered from the printing station and from the sheet receiving module.

14. A printing machine according to claim 11, further comprising means for displaying a first error message when a cycle down has occured.

15. A printing machine according to claim 14, wherein the display means generates a second error message that a security problem has been detected and requests that a security identification number be entered into said operator input means, said second error message being generated as said comparing means inhibits operation of the printing station.

16. A printing machine according to claim 15, further comprising a nonvolatile memory storing valid security codes.

17. A printing machine according to claim 16, wherein said comparing means compares the entered security identification number to a security identification number stored in said nonvolatile memory, said comparing means continuing to inhibit operation of the printing machine when the entered security identification number does not match the stored security identification number, said comparing means enabling operation of the printing machine when the entered security identification number matches the stored security identification.

18. A method for maintaining integrity and security for each sheet transported to and delivered from a printing station of an electrophotographic printing machine when a cycle down has occurred causing an operator to remove sheets therefrom, comprising the steps of:

counting each sheet transported to the printing station from a sheet feeding module and each sheet delivered from the printing station to a sheet receiving module;

entering the number of sheets removed by the operator from the printing machine during cycle down;

comparing the number of sheets transported to the printing station from the sheet feeding module with the number of sheets delivered from the printing station to the sheet receiving module and the number of sheets removed by the operator during cycle down whereby the operation of the printing machine is inhibited when the number of sheets transported to the printing station does not equal the number of sheets delivered from the printing station to the sheet receiving module and the number of sheets removed by the operator during cycle down, and enabling operation of the printing machine when the number of sheets transported to the printing station from the sheet feeding module equal the number of sheets delivered to the sheet receiving module from the printing station and the number of sheets removed by the operator during cycle down.

19. A method according to claim 18, wherein said method further comprises displaying a message on a display unit that a security problem has been detected and requesting that a security identification number be entered into an input means.

20. A method according to claim 19, wherein said method further comprises comparing the entered security identification number to a security identification number stored in a nonvolatile memory.

21. A method according to claim 20, wherein said method further comprises continuing to inhibit operation of the printing machine when the entered security identification number does not match the security identification number stored in the nonvolatile memory.

22. A method according to claim 20, wherein said method further comprises enabling operation of the printing machine when the entered security identification number does match the security identification number stored in the nonvolatile memory.

23. A method according to claim 18, wherein said method wherein said method further comprises producing a printout of printing parameters, said printing parameters comprising at least sheets fed, sheets delivered, and sheets removed.

* * * * *